US012602018B2

(12) United States Patent
Weißbacher

(10) Patent No.: US 12,602,018 B2
(45) Date of Patent: Apr. 14, 2026

(54) OPERATION OF A MULTI-AXIS SYSTEM

(71) Applicant: B&R INDUSTRIAL AUTOMATION GMBH, Eggelsberg (AT)

(72) Inventor: Joachim Weißbacher, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 401 days.

(21) Appl. No.: 18/039,067

(22) PCT Filed: Nov. 29, 2021

(86) PCT No.: PCT/EP2021/083402
§ 371 (c)(1),
(2) Date: May 26, 2023

(87) PCT Pub. No.: WO2022/112567
PCT Pub. Date: Jun. 2, 2022

(65) Prior Publication Data
US 2024/0085862 A1 Mar. 14, 2024

(30) Foreign Application Priority Data
Nov. 30, 2020 (AT) ................................ A51046/2020

(51) Int. Cl.
*G05B 13/02* (2006.01)

(52) U.S. Cl.
CPC .................................. *G05B 13/021* (2013.01)

(58) Field of Classification Search
CPC ................ G05B 13/021; G05B 13/024; G05B 2219/50218; G05B 2219/50234; G05B 19/4142; H02P 5/50; H02P 6/04; H02P 5/00; H02P 5/46; H02P 5/68; H02P 5/69; H02P 5/74; H02P 5/747
See application file for complete search history.

(56) References Cited

U.S. PATENT DOCUMENTS

| | | | |
|---|---|---|---|
| 4,772,831 A | 9/1988 | Casler, Jr. et al. | |
| 6,300,738 B1 | 10/2001 | Weinhofer | |
| 6,427,590 B1* | 8/2002 | Rossler ............... | B41F 13/0045 |
| | | | 101/248 |

(Continued)

FOREIGN PATENT DOCUMENTS

| | | |
|---|---|---|
| CN | 109495026 | 3/2019 |
| DE | 44 34 525 | 3/1996 |

(Continued)

OTHER PUBLICATIONS

Austria Search Report conducted in counterpart Austria Appln. No. A 51046/2020 (Nov. 30, 2020).

(Continued)

*Primary Examiner* — Santosh R Poudel
(74) *Attorney, Agent, or Firm* — GREENBLUM & BERNSTEIN, P.L.C.

(57) ABSTRACT
In order to provide an optimized multi-axis system having mechanically coupled axes, a feedforward control identification process is provided, during which actual identification variables occurring in each case at the motor are each provided to identification units associated with the feedforward controllers, wherein feedforward control parameters are identified using the actual identification variables, and closed-loop controllers are parameterized using the feedforward control parameters.

19 Claims, 1 Drawing Sheet

(56) References Cited

U.S. PATENT DOCUMENTS

Figure 1:
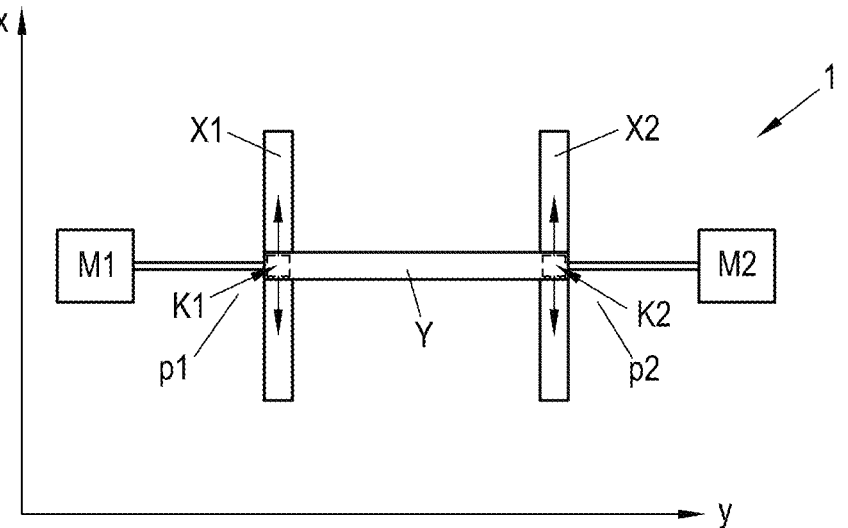

| 2004/0112164 | A1* | 6/2004 | Asano | G03F 7/70758 |
| | | | | 74/490.09 |
| 2006/0119829 | A1* | 6/2006 | Cox | G03F 7/70725 |
| | | | | 355/72 |
| 2007/0099749 | A1* | 5/2007 | Zillmer | F02N 11/00 |
| | | | | 477/3 |
| 2009/0056022 | A1* | 3/2009 | Reitz | A61B 6/465 |
| | | | | 5/601 |
| 2011/0186545 | A1* | 8/2011 | Mahadeswaraswamy | |
| | | | | G05B 6/02 |
| | | | | 700/211 |
| 2013/0116814 | A1* | 5/2013 | Yang | G03F 7/70725 |
| | | | | 700/121 |
| 2015/0175257 | A1* | 6/2015 | Gorce | B64C 25/405 |
| | | | | 701/3 |
| 2018/0107173 | A1 | 4/2018 | Tian | |

FOREIGN PATENT DOCUMENTS

| DE | 10 2016 218 464 | 8/2017 |
| EP | 0 496 059 | 7/1992 |
| JP | 2009-201196 | 9/2009 |
| WO | 2016/201950 | 12/2016 |

OTHER PUBLICATIONS

Int'l Search Report (Form PCT/ISA/210) conducted in Int'l Appln. No. PCT/EP2021/083402 (Mar. 17, 2022).

Int'l Written Opinion (Form PCT/ISA/237) conducted in Int'l Appln. No. PCT/EP2021/083402 (Mar. 17, 2022).

Int'l Prelim. Exam. Report (Form PCT/IPEA/409) conducted in Int'l Appln. No. PCT/EP2021/083402 (Oct. 11, 2022).

China Office Action conducted in counterpart China Appln. No. 202180080139 (Dec. 31, 2025).

* cited by examiner

OPERATION OF A MULTI-AXIS SYSTEM

The present invention relates to a method for operating a multi-axis system comprising a plurality of basic axes and a drive axis which is mechanically coupled to the basic axes at coupling points, the positions of the coupling points on the basic axes being changeable by means of an associated motor in order to move the drive axis in relation to the basic axes, closed-loop control units being provided which are associated with the motors and determine control input variables from specified setpoint variables, preferably setpoint positions, and from associated corresponding actual variables, preferably the positions, occurring at the motor and provide said control input variables to the motors in order to control the corresponding actual variables in accordance with the specified setpoint variables, a feedforward control unit associated with the motors being provided in each case, which feedforward control unit in each case determines a feedforward control value based on the associated specified setpoint variable and superimposes said value on the associated control input variable. The present invention further relates to a multi-axis system comprising a plurality of basic axes and a drive axis, the drive axis being mechanically coupled to the basic axes at coupling points and the positions of the coupling points on the basic axes being changeable by means of an associated motor in order to move the drive axis in relation to the basic axes, closed-loop control units being provided which are associated with the motors and are designed to determine control input variables from specified setpoint variables, preferably from setpoint positions, and from associated, corresponding actual variables, preferably the positions, occurring at the motor and to provide said control input variables to the motors in order to control the associated, corresponding actual in accordance with the setpoint variables, feedforward control units being provided which are each associated with the basic axes and are designed to determine feedforward control values from the setpoint variables and to superimpose said values on the control input variables.

In coupled multi-axis systems, a drive axis is provided which is connected to a plurality of basic axes via coupling points in each case. The position of the coupling points can be moved in relation to the basic axes, as a result of which the drive axis is moved in relation to the basic axes. Gantry systems and injection molding machines may be mentioned as coupled multi-axis systems by way of example. Gantry systems are used in laser cutters, glass cutters and woodworking machines, etc., for example. Objects, e.g. tools, are arranged on the drive axis, which objects can thus be positioned in a working region with a high level of precision by means of the movement of the drive axis. Transport systems having a plurality of transport units which are mechanically coupled to one another (long stator linear motors, planar motors, continuous conveyors, etc.) can also be provided as multi-axis systems, the transport units being viewed as basic axes which are mechanically coupled via a drive axis.

A motor assigned to the coupling points is provided in the multi-axis system in each case in order to move the position of the coupling points on the basic axes. The motors can be of a rotary or linear nature and, for example, can be designed as stepper motors. A number of actual variables, e.g. positions, speeds, accelerations, torques, currents, etc., occur at the motors in each case. A closed-loop control unit is provided for each motor and thus for each basic axis, which control unit determines control input variables from specified setpoint variables and associated corresponding actual variables occurring at the motor and provides said control input variables to the associated motor in order to control the associated actual variables. e.g. the positions of the coupling points. In a closed-loop manner. In this case, it is not only the actual variables corresponding to the setpoint variable (for example a position corresponding to the setpoint position) that occur in each case, but also the aforementioned number of actual variables. The corresponding actual variable is thus selected from the number of actual variables. In order to prevent the basic axes from becoming mechanically distorted, the setpoint positions of the associated closed-loop control units are specified by a central setpoint generator. This means that, during normal operation, the motors are only controlled in a closed-loop manner as a group.

In order to improve the closed-loop control behavior of the closed-loop control units, one feedforward control unit can be provided per control unit for carrying out a feedforward control process. The feedforward control unit applies a feedforward control value to the control input variable of the associated closed-loop control units, which feedforward control value is dependent on the setpoint variable, but independent of the corresponding actual variable and thus of the system controlled in a closed-loop manner. Since the feedforward control is open-loop control and not closed-loop control, it can improve the closed-loop control behavior without endangering the stability of the control loop. An additional control input variable requirement, which is to be expected, for example, on the basis of a specific setpoint curve, can be taken into account by means of the feedforward control values.

The feedforward control is parameterized using suitable feedforward control parameters before the actual operation. In case of a suitable choice of the feedforward control parameters, the control can be optimized, for example by improving following error behavior.

In order to prevent mechanical damage to the multi-axis system, automated parameterization of the feedforward control units has hitherto been dispensed with. Rather, the determination of the feedforward control parameters of multi-axis systems having axes which are coupled to one another is carried out manually, which is very time-consuming and also prone to errors. CN 109495026 A describes a gantry system as a multi-axis system, in which a feedforward control process is provided for speed, but no identification of feedforward control parameters is described.

An object of the present invention is that of providing an optimized multi-axis system having mechanically coupled axes.

According to the invention, this object is achieved by a method in which, during a feedforward control identification process, actual identification variables occurring at the motor are provided to identification units associated with the feedforward control units, feedforward control parameters being identified using the actual identification variables and the dosed-loop control units being parameterized using the feedforward control parameters. This object is also achieved by providing identification units associated with the basic axes, which identification units are designed to identify feedforward control parameters using actual identification variables occurring at the motor and to parameterize the feedforward control units using the feedforward control parameters. The multi-axis system is then operated using the dosed-loop control units and correspondingly parameterized feedforward control units.

The actual identification variable occurs at the motor and preferably corresponds to the corresponding actual variable. The closed-loop control units each provide control input variables to the associated motors in order to control the corresponding actual variable in accordance with the associated setpoint variable, as a result of which the position of the associated basic axis is in turn controlled. A plurality of actual variables occur at the motors. The identification units are each supplied with an actual identification variable selected from the plurality of actual variables. The identification units determine feedforward control parameters quickly, easily and automatically using the relevant actual identification variable. These feedforward control parameters are each provided to the associated closed-loop control unit for parameterization. During normal operation, the feedforward control unit applies a feedforward control value to the control input variable of the associated dosed-loop control unit in each case. Following error behavior can thus be improved, which makes more precise process steps possible. If, for example, a tool arranged on the drive axis is controlled as an object by the multi-axis system, a higher following accuracy and thus a higher processing quality can be achieved when carrying out a feedforward control process using feedforward control parameters determined according to the invention.

During the feedforward control identification process, mutually synchronized setpoint variables can be provided to the identification units and used by the identification units to identify the feedforward control parameters.

Further feedforward control parameters can be interpolated from the determined feedforward control parameters.

During the feedforward control identification process, profiles of mutually synchronized setpoint variables can be provided to the identification units and used by the identification units to identify the feedforward control parameters. Therefore, during the identification process, profiles of setpoint variables are specified by a setpoint generator in accordance with identification profiles. These setpoint variables are provided to the closed-loop control units and feedforward control units as well as the identification units.

The identification profiles are designed to excite the mechanical system and can contain, for example, a ramp-shaped setpoint curve. Noise signals such as PRBS (pseudorandom binary sequence) signals can also be used.

Likewise, profiles of the actual identification variables can be provided to the identification units during the feedforward control identification process and used by the identification units to identify the feedforward control parameters.

A setpoint position (or a profile of a setpoint position as an identification profile) is preferably specified for the feedforward control identification process in each case, and an actual current or an actual torque (or a profile of an actual current or an actual torque) is preferably used as the actual identification variable. Setpoint positions (or profiles of the setpoint position) are thus in each case provided to the closed-loop control unit, the feedforward control unit and the identification unit, wherein, in addition to the position as the corresponding actual variable (which is fed back to the closed-loop control unit to determine the control input variables), actual currents and/or actual torques also occur as actual variables. These actual currents and/or actual torques (or the profiles thereof) are each processed by the identification unit together with the setpoint position (or the profile thereof) in order to determine the feedforward control parameters.

A position (or a profile of a position) is preferably used as the actual identification variable for the feedforward control identification process in each case. The setpoint variables (preferably setpoint positions) are thus in each case provided to the closed-loop control unit and the feedforward control unit, positions occurring as corresponding actual variables which are fed back to the closed-loop control unit in order to determine the control input variables.

However, these positions (or the profiles thereof) are not only used as corresponding actual variables, but also as actual identification variables, and are thus processed by the relevant identification unit together with the setpoint position of the setpoint variable (or the profile thereof) in order to determine the feedforward control parameters.

The feedforward control identification process preferably takes place before normal operation of the multi-axis system. This means that the multi-axis system is only switched to normal operation when the feedforward control units are parameterized in accordance with the identified feedforward control parameters. In order to optimize the feedforward control parameters, the feedforward control units can also first be parameterized using the feedforward control parameters and then controlled using setpoint variables (or profiles of setpoint variables in accordance with the identification profile). This way, optimized feedforward control parameters are obtained, which are used for the optimized parameterization of the feedforward control units. The multi-axis system can then be switched to normal operation using feedforward control units which have been parameterized using the optimized feedforward control parameters.

The feedforward control parameters can also be identified and thus optimized during normal operation. In this case, instead of special identification profiles, the movement profiles provided during normal operation are used as the setpoint variables, the movement profiles being suitable for exciting the control loop.

The mutually synchronized setpoint variables (or their profiles as identification profiles) can be specified by a central setpoint generator or by setpoint generators which are each synchronized with one another.

The basic axes are preferably arranged in parallel with one another.

At least some of the motors, preferably each motor, can be a rotary motor or a linear motor.

During the feedforward control identification process, acceleration-proportional and/or speed-proportional and/or direction-dependent and/or constant components of the feedforward control parameters can be determined. If a mechanical mass is moved, a force (e.g. a torque) is required for this purpose. This force can be provided in order to overcome inertia (proportional to acceleration) and/or viscous friction (proportional to speed) and/or static friction (depending on the direction) and/or, in particular in the case of lifting movements, the force of gravity (constant component). Correspondingly, these forces can be taken into account when determining the feedforward control parameters.

Figure 2:
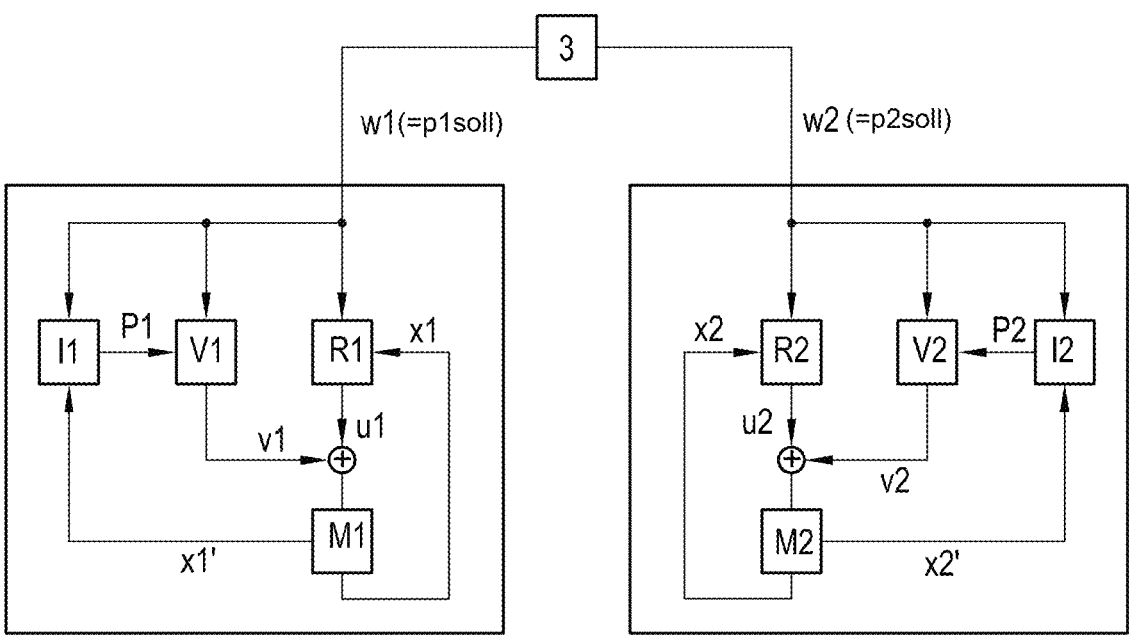

The present invention is described in more detail in the following with reference to FIGS. 1 and 2, which schematically show, in a non-limiting manner, advantageous embodiments of the invention by way of example. In the drawings:

FIG. 1 shows an exemplary multi-axis system having basic axes which are mechanically coupled via a drive axis, FIG. 2 shows an identification of feedforward control parameters in the multi-axis system.

FIG. 1 shows a multi-axis system 1 comprising a plurality of basic axes X1, X2 and a drive axis Y, the drive axis Y being mechanically coupled to the basic axes X1, X2 at coupling points K1, K2. The coupling points K1, K2 can also be regarded as coupling regions. The positions p1, p2 of the coupling points K1, K2 on the basic axes X1, X2 are each changeable by means of an associated motor M1, M2, as a result of which the drive axis Y can be moved with respect to the basic axes X1, X2. The motors M1, M2 can each be arranged on the drive axis Y or on the basic axis X1, X2. Furthermore, an object can be provided on the drive Y, the object position of which is preferably movable along the drive axis Y (not shown). A two-dimensional Cartesian coordinate system is provided in FIG. 1, the axis of abscissas y and the ordinate axis x spanning the xy plane. The basic axes X1, X2 are in this case, for example, parallel to the ordinate axis x, the drive axis Y being parallel to the axis of abscissas y.

Multi-axis systems 1 according to the invention can be used, for example in injection molding machines, laser cutters, glass cutters, woodworking machines, etc., to carry out machining processes or manufacturing processes; an object can in this case be arranged on the drive axis Y, which object is positioned with a high level of precision in a working region by movement of the drive axis Y. For example, a tool and/or a camera can be arranged as an object on the drive axis Y, which can thus be positioned with a high level of precision in a target region (e.g. in a working region) by movement of the drive axis Y, for example in machining processes or manufacturing processes. The object position of the object can preferably be moved along the drive axis Y (i.e. along the axis of abscissas y in FIG. 1), which can be carried out by a further motor. It is also conceivable that a fine positioning system is also provided, which, after the movement/positioning of the drive axis Y and/or the object, carries out an additional, even more precise adjustment of the positions p1, p2 and/or the object along the drive axis Y.

The system 1 shown in FIG. 1 corresponds to a gantry system. One or more further basic axes can also be provided, each of which is connected to the drive axis Y via further coupling points. The positions of the other coupling points on the further basic axes can be analogously controlled by a further motor.

An exemplary identification of feedforward control parameters is shown in FIG. 2. The motors M1, M2 are each controlled by a closed-loop control unit R1, R2 by means of a control input variable u1, u2, a plurality of actual variables occurring at the motors M1, M2, e.g. positions p1, p2, speeds v1, v2, accelerations a1, a2, torques T1, T2, currents i1, i2 etc. When controlling the motors M1, M2, servo amplifiers and/or electronic 1:1 transmissions can also be provided in each case.

A setpoint variable w1, w2 is provided to each of the closed-loop control units R1, R2. Furthermore, a corresponding actual variable x1, x2 from the number of actual variables, which corresponding actual variable is associated with the setpoint variables w1, w2, is fed back to the closed-loop control units R1, R2 in order to determine the control input variable u1, u2. As mentioned, the control input variable u1, u2 is provided to the associated motor M1, M2 in order to control the corresponding actual variable x1, x2 to the associated setpoint variable w1, w2 in each case. This means that, when specifying a setpoint position p1soll, p2soll as the setpoint variable w1, w2, the position p1, p2 is used as a corresponding actual variable x1, x2 in order to determine the control input variables u1, u2.

The corresponding actual variables x1, x2 of the respective axes X1, X2, i.e., of the coupling points K1, K2, can be changed fundamentally independently of one another via the motors M1, M2. However, since the axes X1, X2 or the coupling points K1, K2 are mechanically connected to one another via the drive axis Y, the closed-loop control units R1, R2 are coupled to a common setpoint generator 3 during normal operation of the multi-axis system 1, which common setpoint generator provides the setpoint variables w1, w2 to the closed-loop control units R1, R2 in a synchronized manner. Therefore, during operation, the motors M1, M2 are moved only as a group by the provision of the setpoint variables w1, w2 by the setpoint generator 3, in order to prevent mechanical tension.

In order to improve the dosed-loop control behavior, in particular the following error behavior, of the closed-loop control units R1, R2, one feedforward control unit V1, V2 is provided per axis X1, X2 in each case. The feedforward control units V1, V2 each receive the associated setpoint variables w1, w2 and each determine a feedforward control value v1, v2 therefrom for applying to the control input variable u1, u2. The feedforward control unit V1, V2 can in each case be an integral part of the associated closed-loop control unit R1, R2 or it can also be designed independently.

The feedforward control units V1, V2, however, have to be parameterized using suitable feedforward control parameters P1, P2. For this purpose, an identification unit I1, I2 is provided in each case according to the invention. The identification units I1, I2 each receive an actual identification variable x1', x2' from the plurality of actual variables of the associated axis X1, X2 and use this to determine the feedforward control parameters P1, P2. The actual identification variables x1', x2' preferably correspond to the corresponding actual variables x1, x2.

Setpoint variables w1, w2, preferably profiles of setpoint variables w1, w2, corresponding to mutually synchronized identification profiles are preferably provided by a centrally arranged setpoint generator 3 or mutually synchronized setpoint generators 3. These setpoint variables w1, w2 are provided to the associated closed-loop control units R1, R2 and the feedforward control units V1, V2 and preferably also to the identification units I1, I2.

The identification units I1, I2 can thus not only receive actual identification variables x1', x2' from the plurality of actual variables of the associated axis X1, X2, but also setpoint variables w1, w2, in order to identify the feedforward control parameters P1, P2 therefrom. The corresponding actual variables x1, x2 correspond to the setpoint variables w1, w2. The actual identification variables x1', x2' can correspond to the corresponding actual variables x1, x2 or be of a different type.

For example, the closed-loop control units R1, R2 may each be designed as a closed-loop position controller, as a result of which they receive setpoint positions pisoil, p2soll as setpoint variables w1, w2 and correspondingly control positions p1, p2 in as corresponding actual variables x1, x2. Actual identification variables x1', x2' (from the number of actual variables) are provided to the identification units I1, I2, in order to identify the feedforward control parameters P1, P2. The positions p1, p2, for example, can be used as actual identification variables x1', x2', as a result of which the actual identification variables x1', x2' correspond to the corresponding actual variables x1, x2. However, currents I1, I2 and/or torques T1, T2, speeds v1, v2, accelerations a1, a2, etc., can also be used as actual identification variables x1', x2'. In addition, the setpoint variables w1, w2 (preferably setpoint positions p1soll, p2soll) can be provided to the identification units I1, I2 in order to determine the feedforward control parameters P1, P2. The setpoint variables w1, w2 (in the case mentioned, the setpoint positions p1soll, p2soll) are consistently specified for each axis X1, X2 by the setpoint generator 3, preferably as an identification profile, which, however, takes place in a mutually synchronized manner.

An identification of the feedforward control parameters P1, P2 on the basis of the associated identification profile (i.e. the profile of the setpoint w1, w2) and of the profile of the actual identification value x1', x2' takes place independently of one another in the individual identification units l1, l2. The identification units l1, l2 also parameterize the feedforward control units V1, V2 in accordance with the determined feedforward control parameters P1, P2.

The feedforward control parameters P1, P2 advantageously contain an acceleration-proportional component (e.g. a moment of inertia), a speed-proportional component (e.g. viscous friction), a direction-dependent component (e.g. static friction in the positive/negative direction) and/or a constant component (e.g. gravity).

If similar basic axes X1, X2 are mechanically coupled to the drive axis Y via coupling points K1, K2 and the coupling points K1, K2 are positioned centrally on the basic axes X1, X2, the respective feedforward control parameters P1, P2 of the feedforward control units V1, V2 are identical. However, if the coupling points K1, K2 are not arranged centrally on the basic axes X1, X2, then the feedforward control parameters P1, P2 of the feedforward control units V1, V2 vary, in particular the inertia as an acceleration-dependent component of the feedforward control parameters P1, P2.

As mentioned, an object can be arranged so as to be movable along the drive axis Y. It is advantageous if the object is arranged at one or more extreme positions along the drive axis Y (for example on the heads of the drive axis Y) and the feedforward control parameters P1, P2 are then identified according to the invention. In this way, the feedforward control parameters P1, P2 can be identified in the event that the object is located on a head (i.e. on a coupling point K1, K2 in FIG. 1) of the Y-axis (first extreme position). A further identification of the feedforward control parameters P1, P2 can be carried out in the event that the object is located on a different head (i.e. at the other coupling point K1, K2 in FIG. 1) (second extreme position). The feedforward control parameters P1, P2 for any object position along the drive axis Y can be determined from the identified feedforward control parameters P1, P2 for the respective extreme positions of the object by means of, for example, linear interpolation. This means that the feedforward control parameters P1, P2 are known as a function of the object position.

The invention claimed is:

1. A method for operating a multi-axis system having a plurality of basic axes and at least one drive axis which is mechanically coupled to the basic axes at coupling points, the positions of the coupling points on the basic axes being changeable by an associated motor in order to move the drive axis in relation to the basic axes, a closed-loop controller associated with the motors, and a feedforward controller associated with each of the motors, the method comprising:

determining, via the closed-loop controller, control input variables from specified setpoint variables and from associated corresponding actual variables occurring at the motor;

providing said control input variables to the motors in order to control the corresponding actual variables in accordance with the specified setpoint variables;

determining, via the feedforward controller, a feedforward control value based on the associated specified setpoint variable; and superimposing said feedforward control value on the associated control input variable, wherein a feedforward control identification process is provided, during which actual identification variables occurring on each motor are each provided to identification units associated with the feedforward controllers, feedforward control parameters being identified using the actual identification variables, and wherein the feedforward controllers are parameterized using the feedforward control parameters.

2. The method according to claim 1, wherein, during the feedforward control identification process, mutually synchronized setpoint variables are provided to the identification units and are used by the identification units to identify the feedforward control parameters.

3. The method according to claim 2, wherein, during the feedforward control identification process, profiles of mutually synchronized setpoint variables are provided to the identification units and are used by the identification units to identify the feedforward control parameters.

4. The method according to claim 1, wherein further feedforward control parameters are interpolated from the determined feedforward control parameters.

5. The method according to claim 1, wherein, during the feedforward control identification process, profiles of the actual identification variables are provided to the identification units and are used by the identification units to identify the feedforward control parameters).

6. The method according to claim 1, wherein an actual current or an actual torque is in each case used as the actual identification variable for the feedforward control identification process.

7. The method according to claim 1, wherein the position is in each case used as the actual identification variable for the feedforward control identification process.

8. The method according to claim 1, wherein the feedforward control identification process takes place before normal operation of the multi-axis system.

9. The method according to claim 1, wherein the feedforward control identification process takes place during normal operation of the multi-axis system.

10. The method according to claim 1, wherein the basic axes are arranged in parallel with one another.

11. The method according to claim 1, wherein at least some of the motors are rotary motors.

12. The method according to claim 11, wherein each of the motors is a rotary motor.

13. The method according to claim 1, wherein at least some of the motors are linear motors.

14. The method according to claim 13, wherein each of the motors is a linear motor.

15. The method according to claim 1, wherein, during the feedforward control identification process, acceleration-proportional and/or speed-proportional and/or direction-dependent and/or constant components of the feedforward control parameters are determined.

16. The method according to claim 1, wherein the specified setpoint variables are setpoint positions and the associated corresponding actual variables are positions occurring at the motor.

17. A multi-axis system comprising:

a plurality of basic axes;

a drive axis, the drive axis being mechanically coupled to the basic axes at coupling points, wherein each position of the coupling points on the basic axes are changeable by an associated motor in order to move the drive axis in relation to the basic axes;

closed-loop controllers which are each associated with the motors that are designed to determine control input variables from specified setpoint variables and from associated corresponding actual variables occurring at the motor and to provide said control input variables to the motors in order to control these corresponding actual variables in accordance with the setpoint variables;

feedforward controllers which are each associated with the basic axes that are designed to determine feedforward control values from the setpoint variables and to superimpose said values on the control input variables, wherein identification units are provided which are each associated with the basic axes and are each designed to identify feedforward control parameters using actual identification variables occurring at the motor and to parameterize the feedforward controllers using the feedforward control parameters.

18. The multi-axis system according to claim 17, wherein the identification units are each designed to determine the feedforward control parameters using profiles of the actual identification variables.

19. The multi-axis system according to claim 17, wherein the specified setpoint variables are setpoint positions and the associated corresponding actual variables are positions occurring at the motor.

\* \* \* \* \*